United States Patent

Ratzel et al.

[11] 4,044,287
[45] Aug. 23, 1977

[54] CIRCUIT FOR ENERGIZING THE ELECTROMOTOR DRIVING A BLOWER

[75] Inventors: Rüdiger Ratzel, Buhl; Helmut Steinmann, Baden-Baden, both of Germany

[73] Assignee: Robert Bosch GmbH, Stuttgart, Germany

[21] Appl. No.: 491,146

[22] Filed: July 23, 1974

[30] Foreign Application Priority Data

July 27, 1973 Germany .............................. 2338215

[51] Int. Cl.² .............................................. H02P 7/00
[52] U.S. Cl. ................................... 318/432; 318/332; 236/35; 62/133
[58] Field of Search ................. 318/432, 139, 332, 433, 318/345 B, 334; 237/12.3 B; 236/35, DIG. 9; 98/2.06, 2.07; 62/133; 417/45; 307/10 R

[56] References Cited

U.S. PATENT DOCUMENTS

| 2,786,173 | 3/1957 | Martin et al. ................... 307/10 R X |
| 3,366,863 | 1/1968 | Riordan et al. ................... 318/332 X |
| 3,396,323 | 8/1968 | Auld ................................ 318/332 X |
| 3,412,305 | 11/1968 | Kanner ............................ 318/332 X |
| 3,422,331 | 1/1969 | Kearns ............................. 318/332 X |
| 3,447,056 | 5/1969 | Kosaka et al. ........................ 318/332 |
| 3,518,519 | 6/1970 | Callan ............................... 318/332 X |
| 3,855,511 | 12/1974 | Smith .............................. 318/345 B |

FOREIGN PATENT DOCUMENTS

2,064,422  7/1972  Germany .............................. 318/432

Primary Examiner—B. Dobeck
Attorney, Agent, or Firm—Michael J. Striker

[57] ABSTRACT

A constant current source is provided for the energizing circuit of an electromotor driving a blower. The constant current source includes a battery connected in parallel with a series circuit including the energizing circuit of the motor, the emitter-collector circuit of a transistor and a control resistance. The transistor and control resistance are part of the constant current source. The base of the transistor is connected to the output of a differential amplifier the first input of which receives a reference voltage while the second input receives a voltage corresponding to the voltage across the control resistance and thus the energizing current. The reference voltage is derived from a potentiometer connected in parallel with the battery.

9 Claims, 2 Drawing Figures

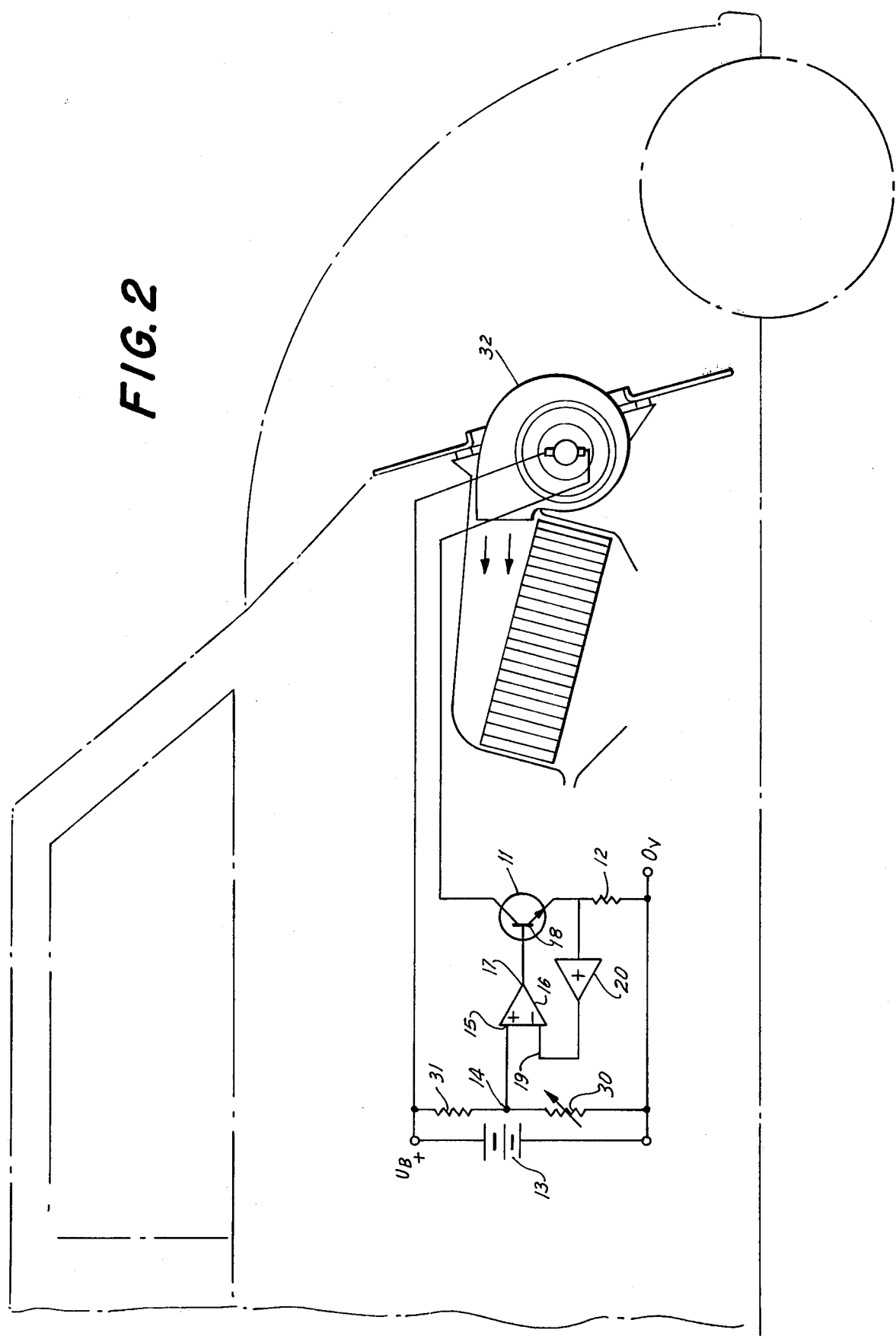

CIRCUIT FOR ENERGIZING THE ELECTROMOTOR DRIVING A BLOWER

BACKGROUND OF THE INVENTION

The present invention relates to circuit arrangements for energizing the electromotor driving a blower in a commercial vehicle. In particular it relates to electromotors driving blowers having a drum rotor with vanes which are curved in the forward direction. Such blowers are used in air conditioning systems in commercial vehicles.

It is known that voltage controlled motors, that is for example a permanent magnet motor which is connected to a voltage source through possibly a variable series resistance, will draw more current for increasing loads, the speed of the motor decreasing simultaneously with the increase in current. If the motor blocks, then, in spite of the relatively low voltage applied to the motor, a sufficiently high current, limited only by the shortcircuit resistance of the motor coils, flows through the motor causing the motor to overheat and an overload to be applied to the whole supply system.

Voltage control of the motor is particularly disadvantageous when the electromotor drives a blower which is subject to large load variations. This effect occurs particularly in air conditioner blowers which are mounted in commercial vehicles. The power drawn by the motor then varies in strong dependence upon the speed of the vehicle or, in other words, on the pressure head produced by the speed. For increasing speeds and thus increasing pressure heads, the electromotor often draws so high a current that either the motor is burned out or the battery voltage collapses. This effect of increasing current consumption takes place particularly when the electromotor drives a radial type blower which has a drum rotor with vanes which are curved in the forward direction.

SUMMARY OF THE INVENTION

It is an object of the present invention to furnish an energizing circuit for an electromotor which energizing circuit prevents the drawing of excessive current by said motor.

In accordance with the present invention, a constant current source for furnishing an energizing current independent of load is supplied to the electromotor.

Constant current sources in general simulate a source having a very high internal impedance relative to the load (in this case the energizing circuit) connected to the constant current source. Variations in the load connected to the source thus result in almost no fluctuations in the current furnished thereto.

Use of a constant current source as the energizing source for an electromotor driving a blower results in the following advantages:

The current drawn by the motor remains constant independent of the pressure head generated by the speed of the vehicle. That is even under high electromotor loads, the current drawn by the electromotor does not increase. This includes the condition where the blower and thus the electromotor are brought to a standstill by the high pressure head developed because of the speed of the vehicle. Overheating of the motor due to excess current drawn thereby is thus effectively prevented. Further, the battery or commmercial vehicle energizing source cannot be substantially overloaded.

The rotational speed of the blower and thus the rotational speed of the motor decrease for increasing loads, so that for a radial-type blower having a drum rotor with vanes which are curved in a forward direction, a partial compensation for changes in the weight rate of flow of air is achieved.

The purpose of providing such a blower, as opposed to providing mere vent passages, is to assure sufficient ventilation with windows closed even when the vehicle is at a standstill or at low city-driving speeds. The air which is forced into the interior of the passenger compartment must of course be brought in from outside the vehicle. As the vehicle speed increases, a pressure head develops upstream of the blower due to the forcing of air thereagainst attributable to the forward motion of the vehicle. The vehicle in moving forward at high speed causes air to be simply rammed into the blower, and such ramming action increases the pressure of the air. The increase in the pressure of the air necessarily causes a proportional increase in the density of the air. For a given rpm of the blower, the volumetric throughput of the blower is substantially constant, determined by the dimensions of the blower. However, with the density of the air increasing as the vehicle speed increases, a greater mass of air is associated with the same volume, so that to move the same volume of now denser air the blower must work considerably harder than at slower vehicle speeds. As a result of this increase in the load applied to the drive motor for the blower, the drive motor will draw a higher current. This can result in overloading of the motor.

The present invention by utilizing a constant current source for energizing the blower of the motor provides a particularly simple way of counteracting such tendency to overload at high vehicle speeds.

Another advantage of the invention is to be seen in the following considerations. As explained above, when the vehicle speed increases, air is rammed into the blower at high pressure and therefore increased density. When such denser air is released into the interior of the passenger compartment which is not subjected to the higher ram pressure, it expands to a larger volume and reassumes its original atmospheric density value. This has the effect of causing an increase in the net volumetric throughput of the blower as considered from the interior of the passenger compartment. Thus, the ventilation will be too great at high vehicle speeds.

The present invention tends to counteract this undesirable phenomenon, too. By energizing the drive motor for the blower utilizing a constant current source, the application of increased load to the blower at increased vehicle speed causes the rpm of the blower to decrease, thereby tending to effect a compensation for the undesirably higher ventilating action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a modification of the circuit of FIG. 1 to include a temperature sensor, and the blower driven by the motor of the modified circuit.

DESCRIPTION OF THE PREFERRED EMBODIMENT

Figure 1:
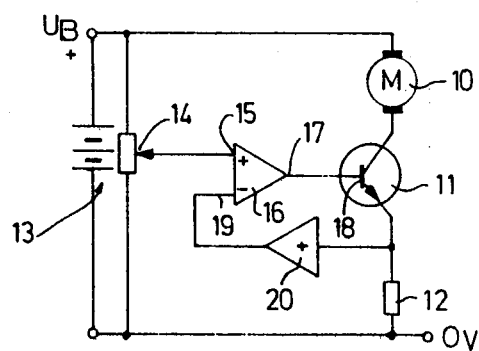
FIG. 1 is a schematic diagram showing a preferred embodiment of the present invention.

A preferred embodiment of the present invention will now be described with reference to the drawing.

In the FIG. 1 electromotor 10 drives a blower which is shown in FIG. 2 and which is part of an air conditioning system in a commercial vehicle. The energizing circuit of the motor is connected in series with the emitter-collector circuit of a transistor 11 as well as with a control resistance 12.

A battery 13 furnishes the voltage to the circuit. Connected in parallel with the battery 13 is a potentiometer 14 which serves as a means for furnishing a reference voltage. The wiper arm of potentiometer 14 is connected to the direct input 15 of a differential amplifier which further has an inverting input 16. The output 17 of the differential amplifier is connected to the base 18 of transistor 11. A line 19 is connected to the inverting input, 16, of the differential amplifier and to the output of an amplifier 20 whose input is connected to the common point of the emitter of transistor 11 and control resistance 12.

The above-described arrangement operates as follows: A reference voltage is applied to the direct input of a differential amplifier by means of the above-mentioned wiper arm of potentiometer 13. This causes a positive voltage to appear at the base of transistor 11 causing this transistor to become conductive. This causes a current to flow from the battery through the motor, the collector-emitter circuit of transistor 11 and control resistance 12. The current continues to increase until the voltage across resistance 12, herein referred to as the control signal, has an amplitude corresponding to the amplitude of the reference voltage applied to the direct input of the differential amplifier.

Let us now assume that the blower which is built into the air conditioning system of a commercial vehicle is loaded by the pressure head developed at higher vehicle speeds, so that the current drawn by the motor should increase. This increase in current would result in a higher voltage drop across resistor 12 and thus in the application of a higher voltage to the inverting input 16 of the differential amplifier this in turn would cause the potential at output 17 of the differential amplifier to change in the direction such that the base-emitter voltage of transistor 11 would decrease causing the current flowing through the motor to be similarly decreased. The current flowing through the motor, that is the energizing current for the motor is thus directly proportional to the voltage applied by potentiometer 13 and can never exceed the value which is fixed by the position of wiper arm 14 on potentiometer 13. Thus the setting of the wiper arm of potentiometer 13 can fix the amplitude of the energizing current of the motor. This of course is equivalent to limiting the power drawn by the motor and further, the current flowing through the motor remains constant for each setting of the potentiometer so that load changes due to increases in the pressure head cannot affect the amplitude of the energizing current.

For an energizing current amplitude fixed by the potentiometer, any increase in the load on the blower will cause a decrease in the rotational speed of the motor. Radial blowers having a drum rotor with forwardly curved vanes have a characteristic curve in which the amount of air moved by the blower decreases within the rotational speed of the blower. Thus a partial compensation for the larger amounts of air moved under conditions of a high pressure head takes place.

As shown in FIG. 1, the voltage tapped from the top of control resistance 12 is amplified before being applied to the differential amplifier. Thus the voltage drop across resistor 12 can be small, resulting in a lower power loss in this resistor. If it is acceptable to use a larger resistor, the voltage across the resistor can be furnished directly to the inverting input of the differential amplifier. Similarly, it is possible to connect the variable arm of potentiometer 13 directly to the base 18 of transistor 11 if resistor 12 is sufficiently large. The base-emitter voltage then decreases directly as a function of the voltage drop across resistor 12, that is resistor 12 serves as a negative feedback resistor.

As shown in FIG. 2, the means for furnishing a reference voltage, instead of potentiometer 14, can be resistors, including a resistor 30 whose resistance varies as a function of temperature, that is that temperature inside the vehicle and an additional resistor 31 which is either a variable or a fixed resistor. The remaining circuitry of FIG. 2 is identical to that of FIG. 1, identical elements in both figures having the same reference numbers. FIG. 2 also shows the blower 32 drivey by motor M. The amount of warm air to be blown into the interior of the vehicle is a function of the temperature in the interior, in the embodiment of FIG. 2.

The main point of the arrangement of the present invention is that the energizing current for the motor cannot exceed a predetermined fixed value as determined by the means for furnishing a reference voltage even when the motor is blocked. Overloading of the motor and of the battery is thus completely eliminated.

The present invention is not to be limited to the application of motors driving blowers in air conditioning systems and commercial vehicles. Many applications may be found for an electromotor driving a load which is subject to large variations and wherein an increase in load causes a corresponding increase in the energizing current of the electromotor. For all such applications the use of a constant current source is to be recommended.

The invention is further not to be limited to blowers of a particular type such as the blowers mentioned above. However, for radial type blowers with a drum rotor and with vanes which are curved in the forward direction the particular circuit of the present invention is particularly useful since it cooperates as described above with the characteristic curve of such rotors to effect a more constant air flow.

While the invention has been illustrated and described as embodied in utilizing a specific form of a constant current source, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from that standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a motor vehicle provided with a blower for blowing air into the interior of the motor vehicle, the blower being a radial-flow blower provided with a drum rotor the vanes of which are curved in the forward direction, and the blower being subjected to a load which varies as a function of the vehicle speed, in combination, an electromotor for driving said blower, whereby said electromotor is likewise subjected to load variations dependent upon vehicle speed, and a constant current source connected to said electromotor for furnishing to the electromotor an energizing current substantially independent of the load applied to said electromotor.

2. A system as set forth in claim 1, wherein said electromotor has an energizing circuit for receiving said energizing current; and wherein said constant current source comprises first circuit means connected to said energizing circuit for furnishing a control signal having an amplitude corresponding to the amplitude of said energizing current, and a controllable resistance circuit connected to said first circuit means and said energizing circuit in such a manner that the resistance of said controllable resistance circuit varies as a function of the amplitude of said energizing current and in a direction for opposing changes in said energizing current.

3. A system as set forth in claim 2, wherein said first circuit means comprise a control resistance connected in series with said energizing circuit of said electromotor.

4. A system as set forth in claim 3, wherein said controllable resistance circuit comprises a transistor having an emitter-collector circuit connected in series with said energizing circuit and said control resistance and having a base; further comprising second circuit means for connecting said base of said transistor to said control resistance in such a manner that the emitter-collector resistance of said transistor varies as a function of the voltage across said control resistance.

5. A system as set forth in claim 4, wherein said second circuit means comprise a differential amplifier having a direct input for receiving a reference voltage, an inventing input connected to said control resistance and an output connected to said base of said transistor; further comprising means for furnishing said reference voltage to said direct input of said differential amplifier.

6. A system as set forth in claim 5, further comprising a battery for energizing said system; and wherein said means for furnishing said reference voltage comprise a potentiometer connected in parallel with said battery and having a wiper arm connected to said first input of said differential amplifier.

7. A system as set forth in claim 6, further comprising an amplifier interconnected between said control resistance and said second input of said differential amplifier.

8. A system as set forth in claim 6, wherein said electromotor drives a motor for blowing air into the interior of a commercial vehicle; and wherein said means for furnishing a reference voltage include a measuring resistor connected to said differential amplifier and mounted in said interior of said vehicle, said measuring resistor having a resistance varying as a function of temperature in said interior, whereby said energizing current has an amplitude varying in dependence upon said temperature in said interior of said vehicle.

9. In a motor vehicle provided with a blower for blowing air into the interior of the motor vehicle, the blower being a radial-flow blower provided with a drum rotor the vanes of which are curved in the forward direction, the blower being of the type which is subjected to a load which increases as the vehicle speed increases and which furthermore undesirably tends to force into the interior of the vehicle a quantity of air which rises in response to vehicle speed increases, in combination, an electromotor connected to said blower and operative for driving said blower, and compensating means operative for at least partially counteracting said tendency of said blower by maintaining the energizing current of said electromotor constant, whereby the tendency to force more air into the interior of the vehicle in response to a vehicle speed increase is counteracted by the electromotor speed decrease which results from the application of increased load to the blower during constant-current energization of the electromotor.

* * * * *